United States Patent [19]
Connell et al.

[11] Patent Number: 4,796,964
[45] Date of Patent: Jan. 10, 1989

[54] METHOD OF UTILIZING A MULTIPLE EMITTER SOLID STATE LASER IN A RASTER OUTPUT SCANNER (ROS)

[75] Inventors: G. A. Neville Connell, Cupertino; Daniel C. Kowalski, Santa Cruz, both of Calif.

[73] Assignee: Xerox Corporation, Stamford, Conn.

[21] Appl. No.: 165,700

[22] Filed: Mar. 9, 1988

[51] Int. Cl.⁴ .............................................. G02B 26/10
[52] U.S. Cl. ....................................... 350/6.8; 350/6.5
[58] Field of Search ................... 350/6.1, 6.4, 6.5, 6.6, 350/6.7, 6.8, 6.9, 6.91, 273, 274

[56] References Cited

U.S. PATENT DOCUMENTS

| | | | |
|---|---|---|---|
| 3,781,111 | 12/1973 | Fletcher et al. | 350/6.6 |
| 4,347,612 | 8/1982 | Fekete et al. | 372/50 |
| 4,404,571 | 9/1983 | Kitamura | 346/108 |
| 4,445,125 | 4/1984 | Scifres et al. | 346/108 |
| 4,525,024 | 6/1985 | Tatsuno et al. | 350/6.5 |
| 4,547,038 | 10/1985 | Mori | 350/6.6 |
| 4,637,679 | 1/1987 | Funato | 350/6.5 |

Primary Examiner—John K. Corbin
Assistant Examiner—Ronald M. Kachmarik
Attorney, Agent, or Firm—W. Douglas Carothers, Jr.

[57] ABSTRACT

Plural overlapped Gaussian-shaped solid state semiconductor laser beams are focused onto the recording medium surface of a printer and will not optically interfere and cause any nonuniformity in printing due to optical interference because the respective laser beams are sequenced in ON/OFF operation so that relative to two or more overlapping laser beam spots focused to a recording medium surface, only one laser beam will be ON at any given time.

4 Claims, 3 Drawing Sheets

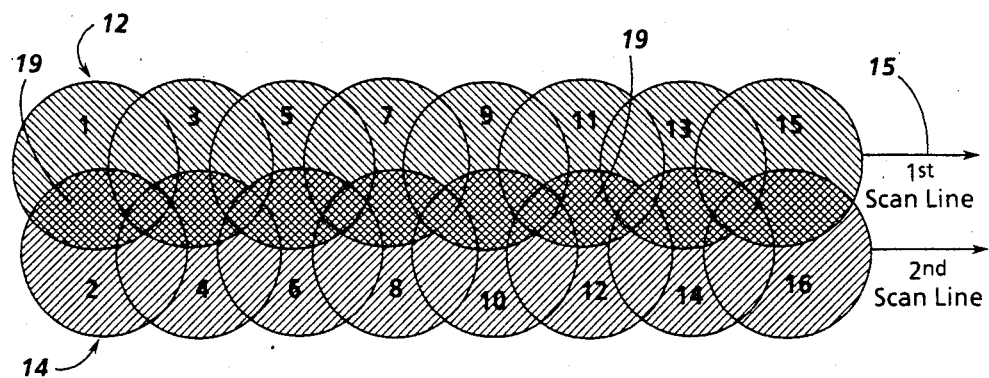
FIG. 4
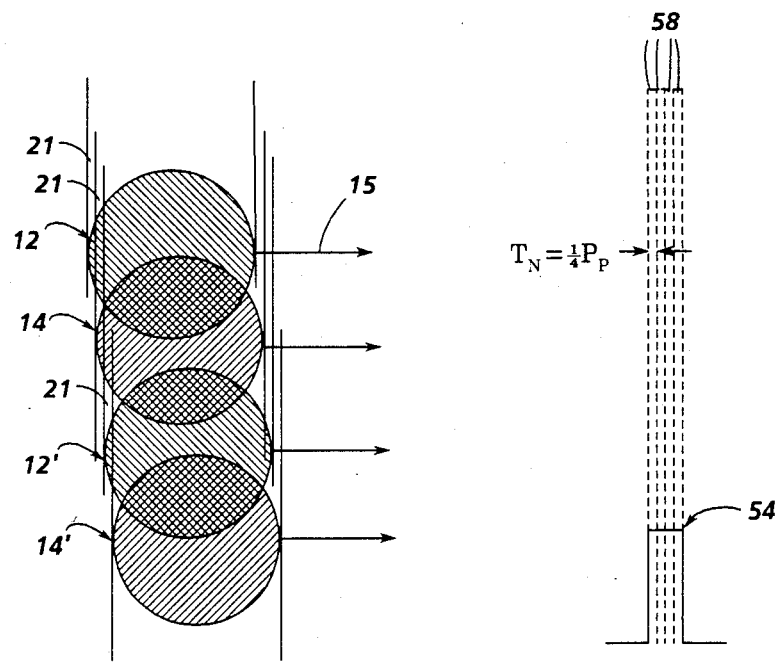
FIG. 6
FIG. 7

METHOD OF UTILIZING A MULTIPLE EMITTER SOLID STATE LASER IN A RASTER OUTPUT SCANNER (ROS)

BACKGROUND OF THE INVENTION

This invention relates to the field of art pertaining to beam scanning using single or multiple light beams, modulated with a signal(s) representative of information to be recorded on a recording medium, such as a photoreceptor, by scanning the surface of the recording medium with the modulated beam(s). In particular, this invention relates to the effective use of overlapping modulated beams from a solid state multi-emitter laser source in a raster output scanner (ROS).

It is well known in the scanning art to utilize a multiple laser beam source for scanning a recording medium surface simultaneously with a plurality of beam spots. The individual beams are independently modulated by information signals and the recording medium is simultaneously scanned by the modulated beams. An important aspect in multibeam scanning has been the arrangement of the beams relative to the scanning direction. With standard laser sources, the spots on the scanned surface are most easily arranged to scan well-separated lines. However, this has the disadvantage that there is a spacing between the picture elements or pixels formed on the recording medium surface so that multiple scan runs must be accomplished to fill in the inbetween element spacings. This requires a significant amount of buffer memory, resulting in additional expense, and can lead under certain circumstances to an unacceptable amount of what is known in the art as banding. One manner of decreasing the inbetween element spacing is to arrange the beams to be inclined at angles relative to the scanning direction. However, the scan start and stop points along the scanned surface will be different for all the beams so that beam detectors and timers must be provided to provide for correct beam start and stop times. An example of the foregoing is disclosed in U.S. Pat. No. 4,404,571.

What would be advantageous is the provision of a solid state multi-emitter laser with output beams that overlap in a direction perpendicular to the scanning direction at the photoreceptor surface. The problem, however, with overlapping beams is that the beams may interfere resulting in undesirable variations in resultant beam intensity and, consequently, printing uniformity. This problem has been traditionally avoided by generating two cross-polarized collimated beams from a laser source, such as single gas laser. An example of such an arrangement is shown in U.S. Pat. No. 4,525,024. This patent discloses a two beam polygon ROS system comprising two laser beams each having a different polarization characteristic, via polarization optic components, which are scanned, via a rotary polygon mirror and lens focusing system, onto the recording medium surface. In the case of spot overlap at the recording medium surface, the separation of the two differently polarized beams at the focused surface is approximately equal to the Gaussian diameter of a single spot. However, because of their cross-polarization, there is no optical interference between the beams and printing uniformity is guaranteed in all possible combinations of beam modulation at the recording medium surface.

More recently, there is U.S. Pat. No. 4,637,679 disclosing a solid state laser having multiple output beams having different polarized characteristics using a polarization beam combiner.

It is quite clear that in future ROS laser printers, the single gas laser source will be replaced by a single chip, multi-emitter semiconductor laser having two or more far field output beams. See for example, U.S. Pat. No. 4,445,125. This replacement has the advantage of replacing the complex optics of the type disclosed, for example, in U.S. Pat. No. 4,525,024, and the requirement of generating two polarized beams from a single source as well as the accompanying cost of such optic components. However, the two or more beams from the solid state laser will not be cross-polarized and, although they will not naturally be at precisely the same emission wavelength, they will oscillate in and out of their dominate wavelength within their spectral emission linewidth. Therefore, they will at times optically intefere with one another when currently operated in their ON state and fail to provide a Gaussian shaped output desirable for uniform intensity printing. So, the problem remains as to how to avoid optical beam interference and resulting variations in printing intensity without the necessity of beam polarization requiring additional optical components.

The object of this invention is to provide for overlapped Gaussian-shaped laser beams focused onto the recording medium surface that will not optically interfere without the need of further modification to the optical properties of the output beams propagating between the laser source and the recording medium surface thereby preventing any possibility of nonuniformity in printing due to optical interference.

SUMMARY OF THE INVENTION

According to this invention, the foregoing mentioned problem is eliminated by sequencing the ON/OFF operation of the respective laser beams so that relative to two or more overlapping laser beam spots focused to a recording medium surface, only one laser beam will be ON at any given time. This is possible with a solid state laser source because the optical output pulse generated from the present state of the art solid state semiconductor lasers have sufficiently small rise and fall times and sufficiently high light intensity and power to enable adequate exposure of the recording medium surface even during a fraction of a picture element or pixel time normally required for forming a latent image on a moving photosensitive surface. This is true even in the case of the currently highest speed laser printers. This principle of alternate ON/OFF operation is extendable from a two spot ROS to a multispot ROS.

The scanning method of this invention provides for a plurality of output beams without the necessity of beam cross-polarization and comprises simultaneously generating a plurality of light beams, deflecting the beams in a primary scanning direction, directing the deflected light beams onto a scanning surface, focusing the light beams to lie substantially along a coordinate axis in a direction substantially orthogonal to the primary scanning direction, further positioning the light beams so that their focused spots on the scanning surface are overlapped along the coordinate axis, scanning in overlapped unison a requisite longitudinal region of the scanned surface parallel to the scanning direction with the focused light beams, and sequentially alternating the operational ON time of the light beams so that no more than one light beam is in an ON condition or state at any given time.

In connection with the understanding and description of the invention, N equals the number of laser beams focused to the recording medium surface and, therefore, the number of scan lines on that surface that can be concurrently scanned across the scan length, L. There are M spots or pixels per scan line and the time available to properly expose a single pixel in a scan line is equal to $T_P$. The amount of power required to achieve proper exposure in time $T_P$ is equal to $P_P$ (mW). Thus, in the case of multiple scanned beams, there will be N sequential scan lines concurrently scanned by N focused laser beams positioned orthogonally or transversely relative to the direction of scan length, L.

The solution of this invention requires that only one laser beam be operational at any given time so that, the ON time, $T_N$, for one of N laser beams during the course of exposure of the same pixels in adjacent N scan lines will be equal to $T_N = T_P/N$. By the same token, since $T_N < T_P$, then, the power of the focused spot during the shorter time, $T_N$, will naturally have to be larger during a shorter exposure time, so that the power, $P_N$, required to expose a pixel in this shorter time, $T_N$, will be $P_N = P_P N$.

Further, if the distance, $d_P$, represents the amount of distance along a scan line during pixel exposure time, $T_P$, which is the product of the pixel exposure time, $T_P$, and the scan rate of the beam, $V_S$ (ips) in the case of a single scan line, then the offset distance, $d_N$, between sequentially exposed pixels in adjacent scan lines in a multiple scan beam system comprising N beams will be equal to $d_N = d_P/N$. The value, $d_N$, therefore, represents the blurring effect due to offset between adjacently exposed pixels in adjacent scan lines. This offset distance is also referred to herein as interbeam scan offset.

Operating under conditions that only one laser beam is in an ON state at any given time during exposure of a single pixel in N can lines, there are two different conditions possible with an increase in the number of scanned beams, N: "fixed" and "enhanced", depending on the scan rate. In the "fixed" condition, the scan rate, $V_S$, is constant. Therefore, the time, $T_N$, for exposure of each pixel is equal to $T_P$ and the power, $P_N$, is equal to $P_P$, as in the case of a single scan line. Under these conditions, the polygon rotational velocity, $\omega$, varies as 1/N. In the "enhanced" condition, the polygon rotational scan rate, $\omega$, is fixed such that $V_S$ increases as the number of laser spots, N. Therefore, the time, $T_N$, for exposure of each pixel in adjacent scan lines will be $T_N = T_P/N$ and the power, $P_N$, is equal to $P_N = P_P N$.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 is an extended illustration of the principal illustrated in FIG. 3 in the scan line direction.

FIGS. 6 and 7 illustrate the same principal illustrated in FIG. 5 in the case of multi-emitter laser having four beams for producing of a plurality of overlapping spots or pixels.

DETAILED DESCRIPTION OF THE PREFERRED EMBODIMENTS

Figure 1:
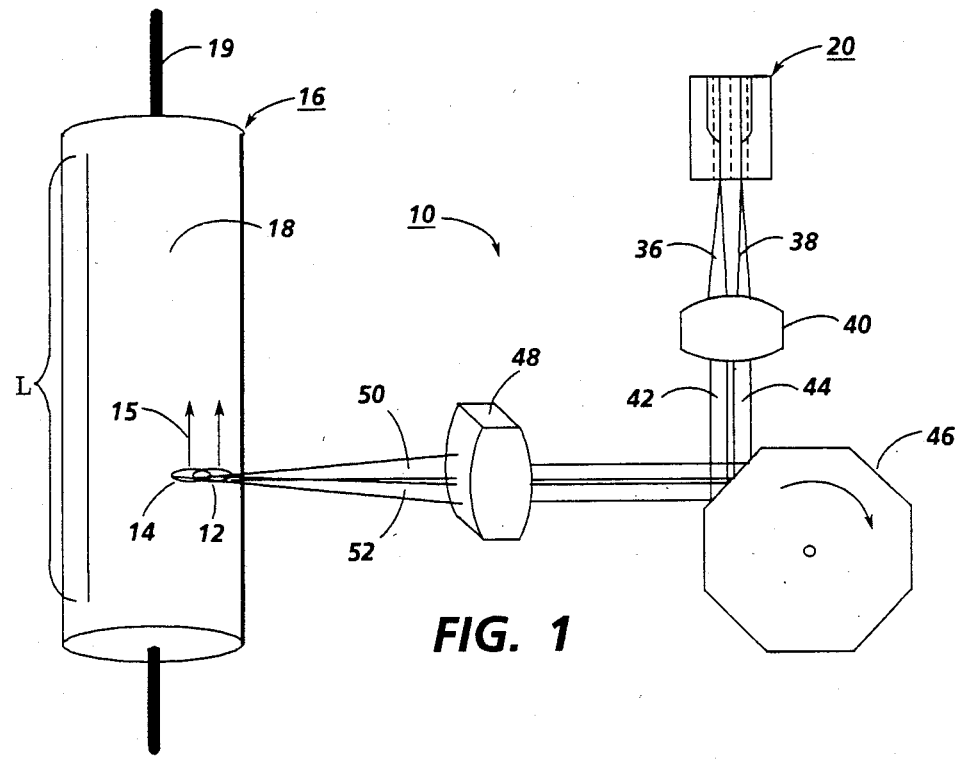
FIG. 1 is a perspective schematic illustration of a ROS recording apparatus for scanning a plurality of laser beams, N, having overlapping spots in the recording medium surface in direction normal to the scanning direction.
Figure 1A:
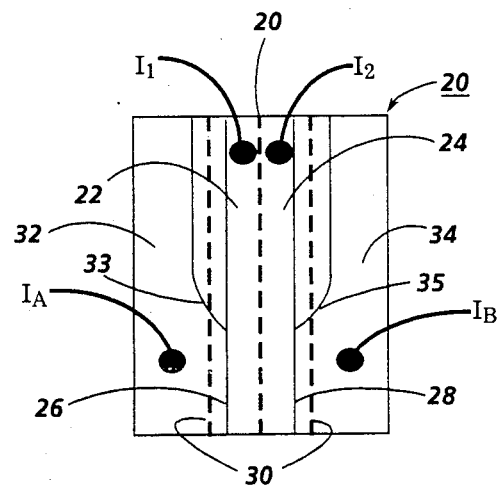
FIG. 1A is a schematic plan view of an array laser for the apparatus of FIG. 1.

Reference is now made to FIG. 1 wherein there is illustrated a recording apparatus 10 for scanning a plurality of overlapping spots 12 and 14 on the photosensitive surface 18 of photosensitive medium 16 in the form of a drum in scanning direction 15. Apparatus 10 includes a multi-beam, solid state semiconductor laser source 20. Array laser 20 may be of the type shown in U.S. Pat. Nos. 4,445,125 or in 4,347,612, which references are incorporated herein by reference thereto. In the case of the latter mentioned patent, a semiconductor laser for high speed modulation is shown and this laser is shown as an monolithic two beam laser emitter 20 in FIG. 1. As best shown in enlarged view of FIG. 1A, laser 20 comprises two emitters 22 and 24 with pumping stripes 26 and 28, which emitters electrically isolated at 20 for independent current pumping via inputs $I_1$ and $I_2$. Each emitter 22 and 24 is also electronically isolated at 30 from a respective optical injector 32 and 34. During high speed modulation of emitters 22 and 24, injectors 32 and 34 are continuously current pumped at inputs $I_A$ and $I_B$ in order to inject radiation, via optically coupled injector stripes 33 and 35 into the respective laser optical cavities, as represented by stripes 26 and 28, while laser emitters 22 and 24 are pulsed at a desired frequency or modulated in operation in accordance with an information data signal via respective inputs $I_1$ and $I_2$.

Injectors 32 and 34 provide for enhancement of response time in the $I_1$ and $I_2$ modulation of laser emitters 22 and 24. The independent operation of injectors 32 and 34 with the modulation of laser emitters 22 and 24 provide for a radiation output response substantially identical to the imposed modulated current pulses at $I_1$ and $I_2$ without any severe limitations imposed by delay and relaxation oscillations to produce a pulse width, of radiation output substantially under 1 nsec.

Referring again to FIG. 1, the diverging radiation from the two beams 36 and 38 from emitters 22 an 24 is collimated by collimator lens 40 to form collimated beams 42 and 44. Beams 42 and 44 are then directed by rotary polygonal mirror 46 onto photosensitive drum 16 in scan line fashion.

The deflected and scanned beams 42 and 44 are focused onto surface 18 of drum 16 by means of a f-θ scanning imaging lens 48 in a manner that the focused beams 50 and 52 produce overlapping laser spots 12 and 14 on surface 18. Overlapped spots 12 and 14 are aligned vertically on surface 18 and are scanned by mirror 46 in direction 15 perpendicular to their vertical alignment and parallel to the axis 19 of drum 16. In this way, there is no inbetween spacing between the abreast and overlapped spots as they are scanned across the drum surface. For best uniformity in xerographic printing, the adjacent Gaussian beams are overlapped basically at their half intensity points. However, optical interference in the region of this overlap may easily occur as these beams are modulated with an information signal applied at inputs $I_1$ and $I_2$ to array laser 20, since the beams are not polarized relative to each other for purposes of optical discrimination. The nonuniformity in intensity will cause undesirable exposure or nonexposure within the overlapped region. We solve this problem by requiring that only one beam be in an ON state in any given period of pixel exposure relative to adjacent scan lines.

Figure 2:
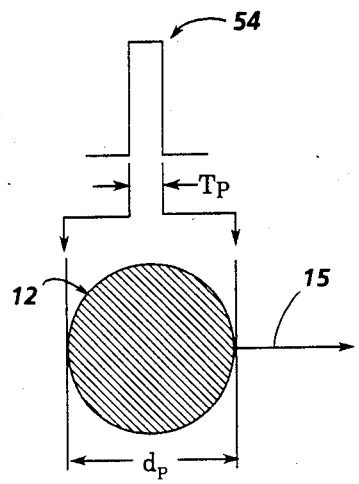
FIG. 2 illustrates a single focused laser spot at the scanned surface and the standard current pulse width of $T_p$ and power level $P_p$ necessary to produce a pixel or spot on the recording medium surface.

FIG. 2 illustrates the case of a single laser spot or pixel 12 focused to drum surface 18. Such a spot or pixel may have, for example, a pixel size, $d_p$, equal to 40-80 μm in diameter. The pulse 43 above pixel 12 represents the current pulse of time $T_P$, with sufficient power level, $P_p$, to form an uniform intensity latent image on drum surface 18. As an example, current $I_1$ at array laser 20 may be at 10 to 50 mA, close to threshold producing a beam with a 4 mW power output and providing a power of 1 mW at photosensitive surface 18.

Figure 3:
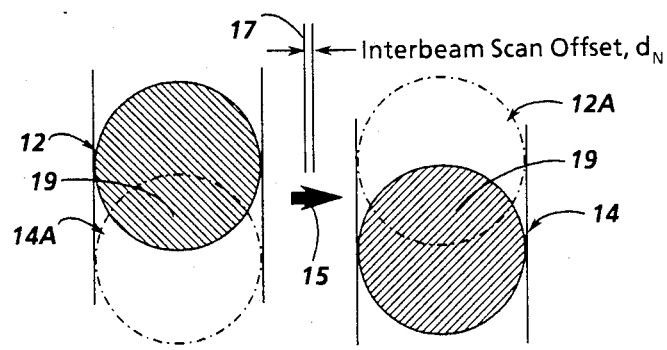
FIG. 3 is a further illustration of the principal of this invention for a two spot ROS wherein one beam is in its OFF state when the other beam is in its ON state.

FIGS. 3 and 4 illustrate the above mentioned solution wherein during time, $T_P$, adjacent overlapped pixels 12 and 14 in adjacent scan lines are alternately exposed. For example, during $T_p$, beam 50 is operated in the first scan time in an ON state to expose pixel 12 while beam 52 remains in its OFF state, as indicated by the dotted circle 14A, followed by operation of beam 52 in the second scan time in its ON state to expose pixel 14 while beam 50 remains in its OFF state, as indicated by dotted circle 12A. The first and second scan times sum to time $T_P$. Since operation of beams 50 and 52 are alternated in operation in $T_P$, there will be a slight difference in position or offset in exposed pixels 12 and 14, as illustrated in FIG. 4 for pixels. This interbeam scan offset 17 is defined as $d_N$.

FIG. 4 illustrates adjacent scan lines of spots or pixels 12 and 14 produced from alternating the ON operation of focused beams 50 and 52 as the same are scanned across surface 18 in scan direction 15 which are sequentially operated, as indicated by the numbers 1 through 16.

As a specific illustration for the case of dual focused beams 50 and 52, both could be focused to a 40 μm spot 12 and 14 on drum surface 18 and would be operational in time $T_P$ but the operation time, $T_N$, of each would be $T_N=T_P/N$ where N is equal to the number of laser beams, i.e., $T_N=T_P/2$. Within time, $T_P$, and exposure of pixels 12 and 14, an interbeam scan offset 17 of 3 μm will have occurred. Thus, two substantially vertically aligned pixels 12 and 14 will have been formed with overlapping images at regions 19 in which no chance for optical interference will have occurred.

Figure 5:
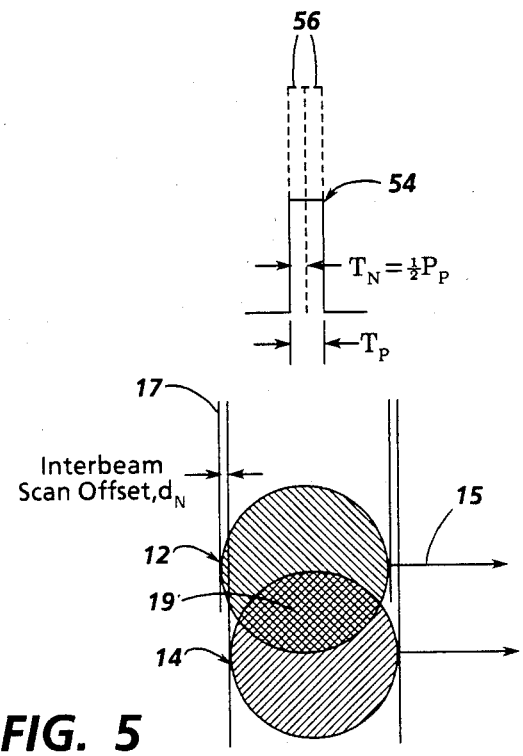
FIG. 5 illustrates the principal of this invention wherein two overlapping spots are produced from a current pulse of half the pulse width but twice the intensity to provide two overlapped pixel spots on the medium surface with a very small interbeam scan pitch, $d_N$.

The foregoing is demonstrated more explicitly in FIG. 5 wherein exposed overlapped pixels 12 and 14 have been produced in time, $T_P$, with alternate operation of two focused lsaer beams 50 and 52. In order to obtain the same level of exposure as in the case of FIG. 2 for a single laser beam, the power output at array laser 20 for each beam 50 and 52 will have to be doubled, i.e., the power, $P_N$, will be equal to $P_P N$ where N is the number of laser beams, i.e., 2. Thus, pulses 56 have twice the intensity level as pulse 54 since they provide the necessary exposure level in half the time or $T_P/2$.

More particularly, in FIG. 5, pulse 56 is turned ON for only half of the time period, $T_p$, while scanning in direction 15 is continued. In order to prevent focused beams 50 and 52 from interfering, the ON times for these beams is alternated so that no such interference will occur. Concurrently, within the same time period, $T_P$, both beams 50 and 52 are in their ON state only in sequence. During time period, $T_P$, the scanning motion of mirror 46 has moved the spot position on surface 18 a very small fraction ($T_N$) of the time, $T_P$, which is indicated in FIG. 3 as the interbeam scan offset 17. Offset, $d_N$, therefore, represents the change in spot position on surface 18 between ON times for pixels 12 and 14.

If there are M spots or pixels per scan line on surface 18 and $T_M$ represents the time required to scan one line, L, along the full length of surface 18, then the time period in which either focused beam 50 or 52 is operationally ON can be much smaller, as long as the intensity and power of the spot at surface 18 is sufficiently large. Thus, if $T_P$ equals $T_M/M$, then a full uninterrupted line of spots should be realized on surface 18. However, as indicated above, there may be blurring of the resultant image at such a line density due to offset 17. The blurring effect appears in case of multiple beams wherein the interbeam scan offset 17 is too large. This blurring effect can be effectively eliminated if $T_N<<T_M$. This is the operating criteria for the present invention so that by making $T_N$ small for operational ON times for respective beams 50 and 52, the blurring effect will be substantially nonexistent and not noticeable to the naked eye.

In other words, timing is accomplished so that the ON time, $T_N$, for each light beam is of a sufficient resolution level, provided by an intensity and power output equal to $P_N$ so that, if the number of beams scanned is equal to N, then their ON time, $T_N$, will be approximately $T_P/N$ and the power output level will be approximately $P_P N$.

FIGS. 6 and 7 are an extension of the concept in FIG. 5. In FIG. 6, four beams are provided from an array laser 20 and focused in vertical alignment onto the surface 18 of drum 16. Each beam has an ON time equal to $\frac{1}{4} T_P$ and are sequentially operated forming staggered pixels 12, 14, 12' and 14' with an interbeam scan offset 21. In order to have sufficient intensity and power, the power output of pulses 58 are four times that of pulse 54 in FIG. 2 and, respectively, have an operational ON time of $T_N = \frac{1}{4} T_P$. To be noted is that the blurring effect the case for FIG. 5 and, in particular, the effect reduced by a magnitude of two since offset 21 will be one half of offset 17 in FIG. 5.

The foregoing is placed in better perspective relative to scanning system 10 in FIG. 1 when considered in conjunction with Table I below. Table I illustrates the requirements for laser scanning and printing with respect to a pixel density of 300 spi, i.e., L=300 pixels per inch in cases where (1) the rate of scanning, $V_S$, is respectively, 5, 10 and 20 ips and (2) the number of semiconductor diode lasers or N is respectively 1, 2 and 4, relative to the present state of the art photoreceptors. The limit relative to N laser beams is determined by the maximum power available from the solid state laser sources.

The blocks of data in Table I are actual requirements for diode laser beam output, $P_P$, in mW and the rotational velocity, $\omega$, for polygon mirror 46 in thousands of rpm to achieve the designated scan rate, $V_S$. Crosshatched blocks of data represent situations wherein a low cost polygon motor may be employed for rotation of mirror 46 whereas the clear blocks of data are represent situations wherein more expensive air bearing motors need be employed for rotation of mirror 46 due to higher scan rates for the given conditions in the case of L=300 spi.

TABLE I

| $P_p$(mW) / $\omega$(krpm) | 300 spi | | |
|---|---|---|---|
| | 5 ips ($V_s$) | 10 ips ($V_s$) | 20 ips ($V_s$) |
| 1 Laser | 2.25 / 9 | 4.5 / 18 | 9 / 36 |
| 2 Lasers | 2.25 / 4.5 | 4.5 / 9 | 9 / 18 |
| 4 Lasers | 2.25 / 2.25 | 4.5 / 4.5 | 9 / 9 |

From an examination of Table I, it can be seen that in order to maintain a given scan rate, $V_S$, the rotational velocity of mirror 46 will be dependent upon the number of laser beams, N, employed so that the scan velocity, $V_S$, will be proportional to $\omega/N$. The exposure time for pixels in adjacent scan lines will be $T_M N$ so that $T_N = T_P$ and power $P_N$ will be equal to $P_P$. This is called the "fixed" condition and is represented by the vertical columns of data blocks in Table I. For example, for a scan rate, $V_S = 5$ ips, in the case of one laser, the rotational velocity of mirror 46 is 9,000 rpm and the laser power, $P_N$, needed is 2.25 mW. In the case of two and four laser beams, the power, $P_P$, is the same but the rotational scan rate of mirror 46 is reduced by a factor of N, or respectively 4500 rpm and 2250 rpm.

The "enhanced" condition is represented by diagonal rows of data blocks from upper left to lower right in Table I. In this case, the rotational velocity is maintained, but in order to increase the scan velocity, $V_S$, it is necessary to increase the power, $P_N$, by $P_P N$. In the case of two and four laser beams and increase from a scan rate, $V_S$, from 5 ips to 10 and 20 ips, the power, $P_N$, will be necessarily raised from $P_P = 2.25$ mW to 4.5 mW and 9 mW, respectively.

While the invention has been described in conjunction with a few specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A scanning method utilizing a plurality of output beams without the necessity of beam cross-polarization comprising the steps of
    generating a plurality of light beams,
    deflecting said beams in a primary scanning direction,
    directing said deflected light beams onto a scanning surface,
    focusing said light beams to lie substantially along a coordinate axis in a direction substantially orthogonal to said primary scanning direction,
    further positioning said light beams so that their focused spots on said scanning surface are overlapped along said coordinate axis,
    scanning in overlapped unison a requisite longitudinal region of said scanned surface parallel to said scanning direction with said focused light beams forming a plurality of scan lines,
    modulating said light beams to expose positional pixels along said scan lines and
    sequentially alternating the operational ON time of said light beams so that no more than one beam is in an ON state at any given time of exposure of the same positional pixels in adjacent scan lines.

2. The method of claim 1 including the step of
    timing the ON time, $T_p$, for each light beam so that each light beam is of a sufficient resolution level provided by a power output equal to $P_P$ so that, if the number of beams scanned is equal to N, then their ON time will be about $T_P/N$ and the output level will be about $P_P N$.

3. A raster output scanner (ROS) for scanning the surface of a recording medium and comprising:
    (a) a semiconductor laser source having two or more emitters for emitting multiple light beams,
    (b) means to independently pulse modulate said emitters via an information data signal,
    (c) means for scanning said surface of said recording medium by said light emitter beams wherein said modulated beams are scanned in overlapped unison fashion across said surface forming an image on said surface, and
    d) means to sequentially alternate the operational ON time of said light beams so that no more than one of said beams is in an ON state as the same are signal modulated and scanned across said surface.

4. A raster output scanner (ROS) for scanning the surface of a recording medium and comprising:
    (a) a semiconductor laser source having two or more emitters for emitting multiple light beams,
    (b) means to independently pulse modulate said emitters via an information data signal,
    (c) means in said array laser source to decrease the response time of said laser source to said pulsed modulation,
    (d) means for scanning said surface of said recording medium by said light emitter beams wherein said modulated beams are scanned in overlapped unison fashion across said surface forming an image on said surface, and
    (e) means to sequentially alternate the operational ON time of said light beams so that no more than one of said beams is in an ON state as the same are signal modulated and scanned across said surface.

* * * * *